Aug. 4, 1953 M. G. TOWNSLEY 2,647,755

ADJUSTMENT PROVIDING ELECTROMAGNETIC HEAD MOUNT

Filed June 9, 1951

Inventor:
Malcolm G. Townsley
By Robert F. Miehle, Jr. Atty.

Patented Aug. 4, 1953

2,647,755

UNITED STATES PATENT OFFICE 2,647,755

ADJUSTMENT PROVIDING ELECTROMAGNETIC HEAD MOUNT

Malcolm G. Townsley, Park Ridge, Ill., assignor to Bell & Howell Company, Chicago, Ill., a corporation of Illinois Application June 9, 1951, Serial No. 230,762

4 Claims. (Cl. 274—24)

My invention relates particularly to a mount for an electromagnetic head such as is used in magnetic sound recording and reproducing apparatus, and has for its object the provision of a simple, effective and conveniently adjustable mount for an electromagnetic head which provides adjustment of the head to properly angularly position the gapped pole portion of the head with respect to a lineal magnetic sound record element such as a tape or film which is moved past the gapped pole portion of the head for recording or reproduction.

The invention will be better understood by reference to the accompanying drawing forming a part hereof and in which—

Figures 1, 2, 3, 4, 5, 6, 7:
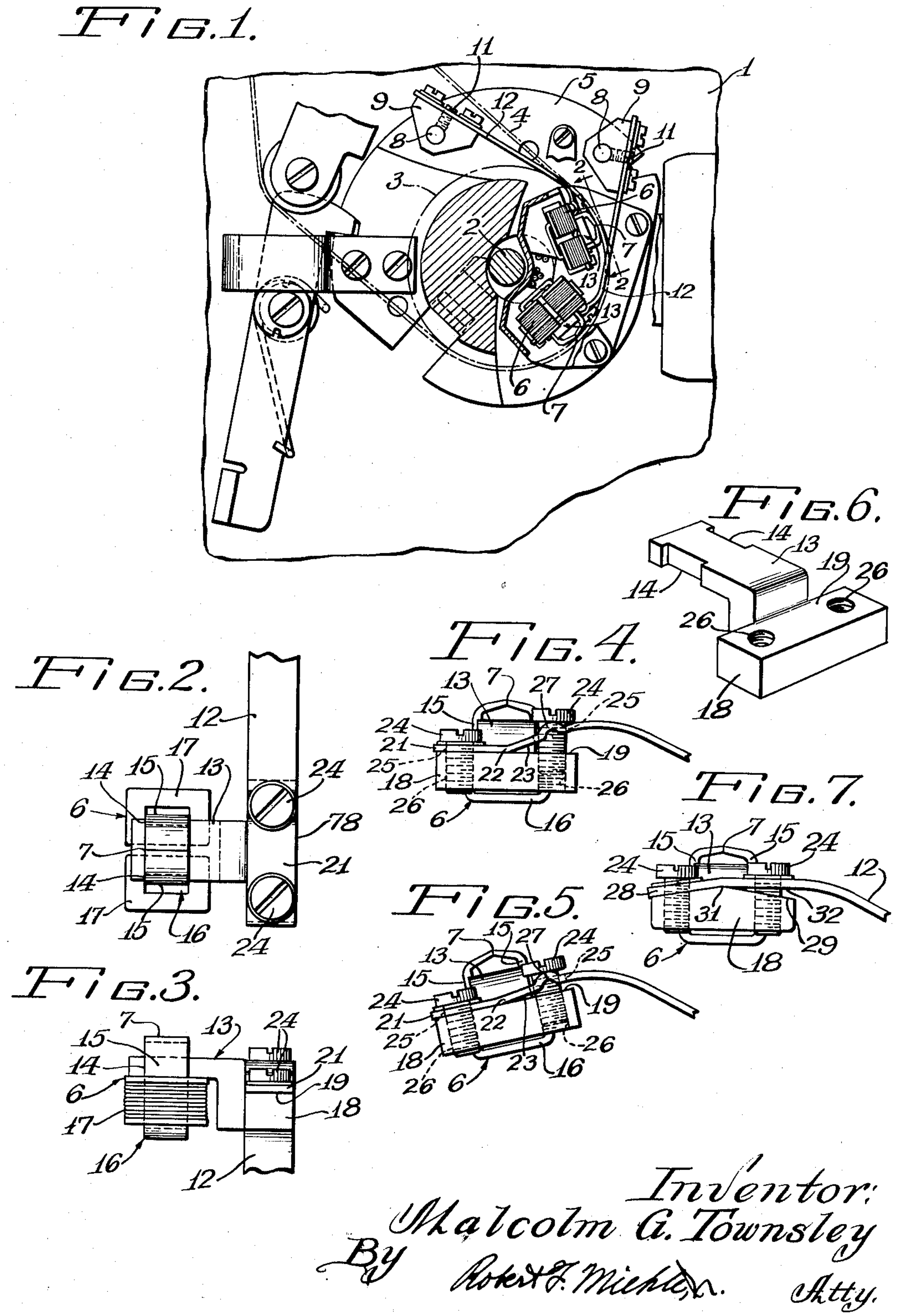
Figure 1 is a partial side elevation of a sound motion picture projecting machine embodying my invention and having parts omitted and shown in section.
Figure 2 is a plan view of an electromagnetic head carried on the mount of my invention.
Figure 3 is an end elevation of the electromagnetic head and mount.
Figures 4 and 5 are side elevations of the electromagnetic head and mount and showing them in different adjustments.
Figure 6 is a perspective view of the electromagnetic head carrier of my invention.
Figure 7 is a side elevation of the electromagnetic head and a mount embodying another form of my invention.

Referring to the drawing, 1 designates a casing forming the base of a sound motion picture projecting machine, see Figure 1. A rotatable shaft 2 is carried with the casing, and a usual "sound" drum, indicated at 3 by a dot and dash line, is carried on the projecting end of the shaft 2 for rotation therewith. A motion picture film strip, indicated at 4 by dot and dash lines, is trained about the drum 3 and is fed at a uniform rate about the sound drum, the drum guiding the film strip past sound translating means for cooperation thereof with a sound track on the film strip.

The projecting machine illustrated in Figure 1 is arranged either for magnetic recording or reprodutcion in cooperation with a magnetic sound track on the film strip or for optical sound reproduction in cooperation with an optical sound track on the film strip, and includes a carrier 5 mounted on the casing for pivotal movement about the axis of the shaft 2 for alternately positioning optical and magnetic sound translating means in cooperative relation with the film strip. However, for the present purposes the carrier 5 may be considered as fixed in its magnetic sound position as shown.

Two electromagnetic heads 6 are mounted on the carrier 5 in adjacently spaced relation about the pivotal axis of the drum 3 and are cooperative with and inwardly of the sound record portion of the film strip 4 at the drum, the gapped pole portions 7 of the heads facing outwardly from the axis of the drum and the heads being resiliently mounted to yieldably urge the gapped pole portions outwardly against the sound record portion of the film strip at the drum as shown in Figure 1, one of the heads constituting an "erase" head and the other constituting a recording and reproducing head as is usual.

The mounting of each electromagnetic head comprises a stud 8 fixed on the carrier 5 in parallelism with the shaft 2 and spaced a greater distance from the axis of the drum 3 than the radius of the drum, a bored support block 9 pivotally engaged on the stud and secured in pivotally adjusted position thereon by a set screw 11, a spring support arm 12 having one end thereof secured on the support block 9 and extending in a radial plane of the axis of the drum 3 and having the electromagnetic head mounted on the free end thereof for pressing the gapped pole portion 7 of the head against the sound record portion of the film strip. This arrangement permits of an adequate spring length and adjustment of the spring arm to provide the desired pressure of the electromagnetic heads against the film strip.

The structure above described is described and claimed in copending application for United States Letters Patent of Frank J. Schuessler, Serial No. 217,843, filed March 27, 1951, for improvement in Magnetic Sound and Combined Optical and Magnetic Sound Translating Apparatus, and my invention which pertains to the mounting of the electromagnetic heads 6 on the spring support arms 12, will now be described.

Referring to Figures 2 to 6 inclusive, a carrier 13 of non-magnetic material has one end thereof provided with opposite slots 14 which are engaged between the spaced legs 15 of the core 16 of an electromagnetic head 6 with this end between the coils 17 and the gapped pole portion 7 of the head to secure the head on the carrier. The carrier 13 extends laterally of the head and its other end 18 is offset in the direction away from the gapped core portion 7 of the head and is transversely extended to provide a correspondingly extended flat surface 19 arranged in a plane normal to that of the core 16 and extending transversely of the core legs 15.

The free end portion 21 of a spring support arm 12 overlies the carrier surface 19 and extending along the same, is angled at the medial portion thereof, as designated at 22, to render the support arm end portion 21 angular and to provide the convex surface 23 thereof opposing the flat carrier surface 19. Spaced headed screws 24 are disposed on opposite sides of the medial portion of the support arm end portion 21 and the carrier end 18, and pass through apertures 25 in the support arm end portion and are screwthreaded into screwthreaded bores 26 in the carrier end 18 to secure the support arm end portion 21 and the carrier end 18 together and thus mount the electromagnetic head 6 on the spring support arm 12.

The screws 24 in cooperation with the convex and flat surfaces 23 and 19 and flexure of the support arm end portion 21, provide angular adjustment of the electromagnetic head 6 in the plane of the head core 16 for conveniently adjusting the gapped pole portion 7 into proper angular relation with the sound track portion of the film strip 4, and provide this adjustment by varied flexure of the support arm end portion 21 of the spring support arm 12. Referring to Figures 4 and 5, the outer screw 24 at the outer end of the support arm end portion 21 firmly clamps the outer end of the support arm end portion 21 onto the carrier end surface 19, and the other or inner screw 24 serves as an adjustment screw and is screwthreaded into the carrier end 18 only so far as is required to effect the desired adjustment of the electromagnetic head 6. Figure 4 shows the inner screw 24 at an outer adjustment thereof in which the support arm end portion 21 is flexed a relatively small extent and the gapped pole portion 7 of the head 6 faces vertically, and Figure 5 shows the inner screw 24 at an inner adjustment thereof in which the support arm end portion 21 is deformed a greater extent and the gapped pole portion faces at an angle to the vertical, the tension of the support arm end portion 21 serving to hold the inner screw 24 in adjusted position.

In order to provide a uniform bearing engagement of the head of the inner screw with the support arm end portion 21, this end portion is provided with a transverse corrugation 27 underneath the head of the inner screw and having its convex surface engaged with the head of this screw.

Referring to Figure 7, showing a modification of the invention, the free end portion 28 of the spring support arm 12 is normally flat, and the mounting surface 29 of the end 18 of the head carrier 13 is angled at the medial portion thereof, as designated at 31, to render the surface 29 convex. This convex surface 29 opposes the normally flat surface 32 of the support arm end portion 28, and the headed screws 24, disposed on opposite sides of the medial portion of the support arm end portion 28 and the carrier end 18 and its surface 29 and passing through apertures in the support arm end portion and screwthreaded into the carrier end 18, serve, in cooperation with the convex and flat surfaces 29 and 32 and flexure of the support arm end portion 28, the same purposes as illustrated in Figures 4 and 5 and above described.

While I have thus described my invention, I do not wish to be limited to the precise details described, as changes may be readily made without departing from the spirit of my invention, but having thus described my invention, I claim as new and desire to secure by Letters Patent the following:

1. In an electromagnetic head mount, the combination of an electromagnetic head carrier, a spring support arm having a portion thereof overlying said carrier, the opposing surfaces of said carrier and arm comprising a convex and a flat surface, and spaced securing devices for securing said carrier and arm together in the direction engaging said surfaces and disposed on opposite sides of the medial portion of said convex surface and comprising adjustable means providing angular adjustment of said head with respect to said arm in cooperation with said convex and flat surfaces and flexure of said support arm portion.

2. In an electromagnetic head mount, the combination of an electromagnetic head carrier, a spring support arm having a portion thereof overlying said carrier, the opposing surfaces of said carrier and arm comprising a convex and a flat surface, and spaced securing devices for securing said carrier and arm together in the direction engaging said surfaces and disposed on opposite sides of the medial portion of said convex surface and at least one of said securing devices comprising a screw device providing angular adjustment of said head with respect to said arm in cooperation with said convex and flat surfaces and flexure of said support arm portion.

3. In an electromagnetic head mount, the combination of an electromagnetic head carrier, a spring support arm having a portion thereof overlying said carrier, the opposing surfaces of said carrier and arm comprising a convex and a flat surface, and spaced securing devices for securing said carrier and arm together in the direction engaging said surfaces and disposed on opposite sides of the medial portion of said convex surface and at least one of said securing devices comprising a headed screw passing through said arm and screwthreaded into said carrier and providing angular adjustment of said head with respect to said arm in cooperation with said convex and flat surfaces and flexure of said support arm portion.

4. In an electromagnetic head carrier, the combination of an electromagnetic head carrier, a spring support arm having a portion thereof overlying said carrier, the opposing surfaces of said carrier and arm comprising a convex and a flat surface, and spaced securing devices for securing said carrier and arm together in the direction engaging said surfaces and disposed on opposite sides of the medial portion of said convex surface and said securing devices comprising headed screws passing through said arm and screwthreaded into said carrier and providing angular adjustment of said head with respect to said arm in cooperation with said convex and flat surfaces and flexure of said support arm portion.

MALCOLM G. TOWNSLEY.

References Cited in the file of this patent

UNITED STATES PATENTS

| Number | Name | Date |
|---|---|---|
| 2,550,916 | Davis | May 1, 1951 |
| 2,560,569 | Hare | July 17, 1951 |